Feb. 26, 1957  R. L. BRIGHT ET AL  2,783,384
ELECTRICAL INVERTER CIRCUITS

Filed April 6, 1954  3 Sheets-Sheet 1

WITNESSES
Robert C. Baird
David M. Schiller

INVENTORS
Richard L. Bright &
George H. Royer.
BY C. L. Freedman

ATTORNEY

Feb. 26, 1957   R. L. BRIGHT ET AL   2,783,384
ELECTRICAL INVERTER CIRCUITS
Filed April 6, 1954   3 Sheets-Sheet 3

United States Patent Office 2,783,384
Patented Feb. 26, 1957

2,783,384

ELECTRICAL INVERTER CIRCUITS

Richard L. Bright, Adamsburg, and George H. Royer, Pittsburgh, Pa., assignors to Westinghouse Electric Corporation, East Pittsburgh, Pa., a corporation of Pennsylvania Application April 6, 1954, Serial No. 421,350

19 Claims. (Cl. 250—36)

This invention relates to electrical inverter circuits and has particular relation to inverter circuits employing semi-conductor devices which are responsive to unidirectional quantities for producing alternating output quantities.

In accordance with the invention, an electrical inverter circuit is provided which includes a pair of three electrode semi-conductor devices commonly termed "transistors." The transistors are associated with a suitable source of unidirectional voltage which is to be inverted to provide an alternating quantity. Means are provided for rendering the transistors alternately conductive and non-conductive for controlling the application of the unidirectional quantity to a suitable load device.

In accordance with a specific embodiment of the invention, the load device comprises electromagnetic means including output winding means inductively related to a pair of input winding means. Each of the input winding means is connected for energization from the source of unidirectional voltage through a separate one of the transistors. The transistors are effectively employed as switching devices which are alternately in an open and closed condition for connecting the input winding means in alternation to the source of unidirectional voltage for producing an alternating output quantity in the second winding means.

Such switching action is effectively controlled by the application of reversible polarity biasing potentials between the emitter and base electrodes of each transistor. In one embodiment of the invention, the biasing potentials are derived from a pair of additional winding means which are inductively associated with the input winding means. According to a further embodiment of the invention, the biasing potentials are supplied by means of an independent source of alternating voltage.

It is, therefore, an object of the invention to provide an improved electrical inverter circuit for deriving an alternating output quantity from a unidirectional input quantity.

It is another object of the invention to provide an electrical inverter circuit responsive to a unidirectional quantity for producing an alternating output quantity having a frequency which is a function of the magnitude of the unidirectional quantity.

It is a further object of the invention to provide an electrical inverter circuit including a pair of semi-conductor devices associated with a source of unidirectional voltage with means for rendering the devices alternately conducting and non-conducting to control the application of the voltage source to a suitable load device.

It is still another object of the invention to provide an electrical inverter circuit including a pair of semi-conductor devices connected to control the application of a unidirectional voltage source to saturable magnetic core means effective to produce an alternating output quantity having a frequency which is a function of the magnitude of the unidirectional voltage.

It is still another object of the invention to provide an electrical inverter circuit as defined in the preceding paragraph including means for applying reversible polarity biasing potentials between the base electrode and a single other electrode of each of the semi-conductor devices for rendering such devices alternately conducting and non-conducting.

It is still another object of the invention to provide an electrical inverter circuit as defined in the preceding paragraph wherein the polarities of the biasing potentials are reversible in response to magnetic saturation of the magnetic core.

Other objects of the invention will be apparent from the following description taken in conjunction with the accompanying drawings, in which.

Figure 1:
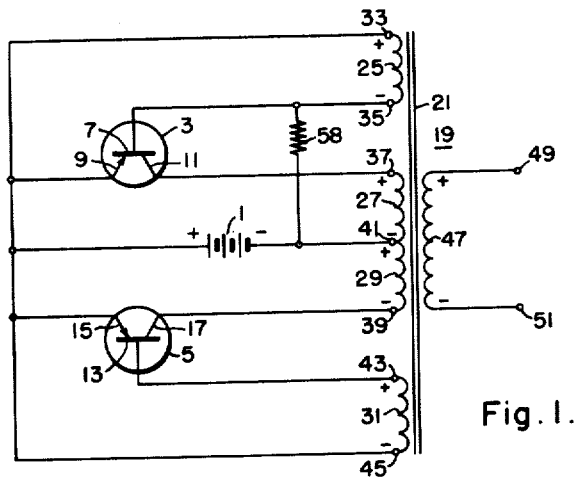
Fig. 1 is a schematic representation of an electrical circuit embodying the invention.

Referring to the drawings, there is illustrated in Fig. 1 a schematic representation of an electrical inverter circuit embodying the teachings of the invention. As shown in Fig. 1, there is provided a suitable source 1 of unidirectional voltage for producing a unidirectional output quantity which is to be inverted to provide an alternating output quantity.

As illustrated in Fig. 1, the inverter circuit includes a pair of switching devices represented generally by the numerals 3 and 5 which are associated with the source 1. In accordance with the invention, each of the devices 3 and 5 is in the form of a three electrode, semi-conductor device commonly referred to as a "transistor." Preferably, the transistors employed are of the junction type although point-contact transistors may also be employed. The junction transistors utilized may be of any suitable construction such as the grown junction type, diffused junction type, or the barrier layer type.

As is understood in the art, a junction type transistor includes a body of semi-conducting material, such as silicon or germanium having prescribed impurities to provide three distinct regions with rectifying junctions between regions of opposite conductivity types. For purposes of the invention, it will be assumed in the following discussion that the transistors employed are of the p-n-p although n-p-n transistors may be utilized equally as well. Suitable contacts are made at the terminal p regions to provide what are known as emitter and collector electrodes. A large area, low resistance contact is made to the semi-conducting body to provide the base electrode. The applying suitable electrical potentials between the various electrodes, current conduction between the emitter and the collector electrodes may be effectively controlled.

In application Serial No. 420,904, filed April 5, 1954, by R. L. Bright and G. H. Royer, there is disclosed a method of biasing a junction type transistor wherein a biasing potential is applied between the base electrode and a single one of the emitter and collector electrodes. For example, in the case of a p-n-p transistor a bias potential is applied only between the base and the emitter electrodes of the transistor with the base electrode being driven sufficiently negative relative to the emitter electrode to provide a saturated condition of the transistor. As herein employed, the term "saturation" means that a further increase in the magnitude of the forward current between the base and emitter electrodes has a negligible effect upon the magnitude of current flowing between the emitter and collector electrodes. For this condition the resistance between the emitter and collector electrodes is of a relatively small value.

As a further example, a p-n-p transistor may be operated in a cut-off condition by applying a biasing potential between the base electrode and the emitter electrode such that the base electrode is driven positive relative to the emitter and collector electrodes. As utilized herein the term "cut-off" means that a further increase in the magnitude of the reverse voltage between the base and the emitter electrodes is ineffective to further decrease current conduction between the emitter and collector electrodes. For this condition the resistance between the emitter and collector electrodes is of a relatively large value.

In the present invention, the above described method of biasing a junction type transistor is utilized although other suitable biasing methods may be employed equally as well. The invention further contemplates the provision of means for applying a reversible polarity biasing potential to the transistor which is effective to cause the transistor to be alternately saturated or cut-off depending upon the polarity of the biasing potential.

As illustrated in Fig. 1, the unidirectional voltage source 1 is represented by a conventional battery having positive and negative terminals as indicated by the plus and minus signs associated with the battery. The transistors 3 and 5 are preferably of the p-n-p junction type with the transistor 3 having a base electrode 7, an emitter electrode 9 and a collector electrode 11. The transistor 5 includes a base electrode 13, an emitter electrode 15 and a collector electrode 17.

In accordance with the invention, the inverter circuit includes saturable magnetic core means represented by the numeral 19. The core means 19 includes a magnetic core 21 which is constructed of material designed for magnetic saturation within the range of energization of the core means 19. Preferably, the material utilized in the core 21 is of a commonly available type having a rectangular hysteresis loop.

The core means 19 includes a plurality of windings 25, 27, 29 and 31 which link the core 21 to be in inductive relation with respect to one another. As illustrated, the winding 25 is provided with a pair of terminals 33 and 35. The windings 27 and 29 are provided respectively with terminals 37 and 39 and constitute together a single winding having a center tap connection 41. The winding 31 is provided with a pair of terminals 43 and 45. An additional winding 47 is also provided which links the magnetic core 21 and which has a pair of output terminals 49 and 51.

As illustrated, in Fig. 1, the terminals 37 and 39 of the windings 27 and 29 are connected respectively to the collector electrodes 11 and 17 of the transistors 3 and 5. The terminals 33 and 35 of the winding 25 are connected respectively to the emitter electrode 9 and the base electrode 7 of the transistor 3. In a similar manner the terminals 43 and 45 of the windings 31 are connected respectively to the base electrode 13 and the emitter electrode 15 of the transistor 5. The emitter electrodes 9 and 15 of the transistors 3 and 5 are each connected to the positive terminal of the source 1 and the center tap connection 41 is connected to the negative terminal of the source 1. With such connections it is observed that the winding 27 is connected for energization from the source 1 through the transistor 3 whereas the winding 29 is connected for energization from the source 1 through the transistor 5.

The operation of the inverter circuit will now be described according to the present understanding of the invention. Let it be assumed initially that for some reason current begins to flow through the emitter 9 to the collector 11 of the transistor 3 from the source 1 and that substantially zero current flows from the source 1 through the emitter 15 to the collector 17 of the transistor 5. Under such conditions the resistance of the transistor 3 is relatively small as compared to the resistance of the transistor 5 with the result that substantially the entire voltage of the source 1 is applied across the winding 27 of the core means 19 to cause current flow from the source 1 through the terminal 37 of the winding 27. As will presently appear, current flowing from the source 1 through winding 27 is effective to induce voltages in windings 25 and 31 of such polarity and magnitude as to maintain conduction of transistor 3 in a saturated condition, and to maintain a cut-off condition of transistor 5.

Figure 2:
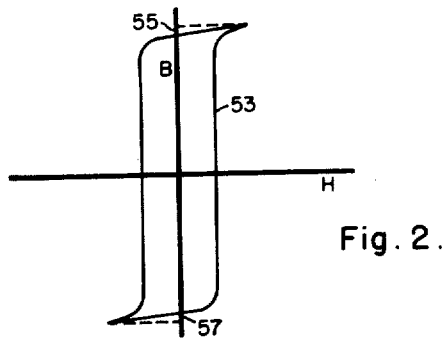
Fig. 2 is a graphical representation illustrating a suitable magnetic induction curve for a magnetic part of the circuit of Fig. 1.

Referring now to Fig. 2 there is illustrated a suitable magnetic induction curve 53 for the core 21 which, as stated hereinbefore, is proportioned to have rectangular hysteresis loop characteristics. When the source 1 is applied across the winding 27 as previously described, a magnetomotive force is established for directing magnetic flux through the core 21 which increases substantially linearly with respect to time by reason of the constant value of voltage of the source 1. Such increasing magnetic flux is effective to induce voltages in the associated windings 25, 29, 31 and 47 of substantially constant magnitude. The connections of the windings 25 and 31 are selected to cause the polarities of the voltages induced therein to be as illustrated in Fig. 1 with the terminal 33 of the winding 25 becoming positive relative to the terminal 35 and with the terminal 43 of the winding 31 becoming positive relative to the terminal 45. The windings 25 and 31 are proportioned so that the voltages induced therein as described drive the emitter 9 of the transistor 3 sufficiently positive with respect to the base 7 thereof, and drive the base 13 of the transistor 5 sufficiently positive with respect to the emitter 15 thereof so that the transistors 3 and 5 are maintained respectively in saturated and cut-off conditions.

As the magnetic flux in the core 21 increases by reason of continued current flow from the source 1 through the winding 27, the core 21 approaches a saturated condition with the result that there is substantially no further increase in the magnetic flux in the core 21 and substantially zero voltages are induced in the windings 25, 27, 29 and 31 to thereby render both of the transistors 3 and 5 substantially non-conducting. Consequently, the source 1 is effectively disconnected from the winding 27 and substantially zero current flows from the source 1 through the winding 27 with the result that substantially zero magnetomotive force is applied to the core 21.

It is observed with reference to the curve 53 of Fig. 2 that as the magnetomotive force falls from a value sufficient to effect saturation of the core 21 to a zero value the magnetic flux present in the core 21 is reduced by an amount indicated by the numeral 55 of Fig. 2. This reduction in magnetic flux is effective to induce voltages in the windings 25 and 31 having polarities which are opposite to the polarities shown in Fig. 1 so that the transistor 3 is maintained in a cut-off condition and the transistor 5 is caused to conduct. When the transistor 5 starts to conduct the previously described operation is reversed so that current from the source 1 now flows through the transistor 5 and into the terminal 39 through the winding 29. Current flowing through the winding 29 as described establishes a magnetomotive force which is effective to direct magnetic flux through the core 21 in the direction opposite from the direction of magnetic flux produced by energization of the winding 27 as previously described.

As current continues to flow from the source 1 through the winding 29 the magnetic flux in the core 21 increases linearly with respect to time to thereby induce voltages of constant magnitude in the windings 25, 27, 31 and 47 having polarities opposite to the polarities of the voltages induced in such windings when the winding 27 is energized from the source 1. Voltages induced in the windings 25 and 31 by energization of the winding 29 are effective to maintain the conducting condition of transistor 5 and the cut-off condition of transistor 3. When the core 21 becomes saturated, zero voltages are induced in the windings 25, 27, 31 and 47 and both of the transistors 3 and 5 are in a cut-off condition to thereby effect disconnection of the source 1 from the winding 29. The magnetic flux in the core 21 is then reduced by an amount indicated by the numeral 57 of Fig. 2 to induce voltages in the windings 25 and 31 of such polarity and magnitude as to effect saturation of transistor 3 and cut-off of transistor 5 to thereby initiate another cycle of operation of the inverter circuit.

It is noticed that two voltage pulses of opposite polarity are induced in the winding 47 for each complete cycle of operation of the inverter circuit to thereby provide an alternating voltage output. It has been observed that such alternating voltage output has a substantially rectangular wave pattern and that the period of each half cycle of this alternating voltage is proportional to the time required for the core 21 to become magnetically saturated after each reversal of the conducting conditions of the transistors 3 and 5. It is further observed that the time required for such saturation is inversely proportional to the magnitude of the voltage of the source 1. Consequently, the frequency of the alternating voltage output is directly proportional to the magnitude of the voltage of the source 1. This characteristic of the output quantity of the inverter circuit renders the circuit highly desirable for use in telemetering applications where it is desired to transmit to remote locations intelligence in the form of an alternating voltage having a frequency which is proportional to the magnitude of a measured direct quantity.

In order to assure that one of the transistors 3 and 5 begins to conduct to a greater extent than the other of the transistors for initiating operation of the circuit, a suitable resistance 58 is connected between the base electrode of one of the transistors and the negative terminal of the source 1. As shown in Fig. 1, the resistance 58 is connected between the base 7 of the transistor 3 and the negative terminal of the source 1. With such arrangement the transistor 3 will begin to conduct and the transistor 5 will be cut-off.

Figure 3:
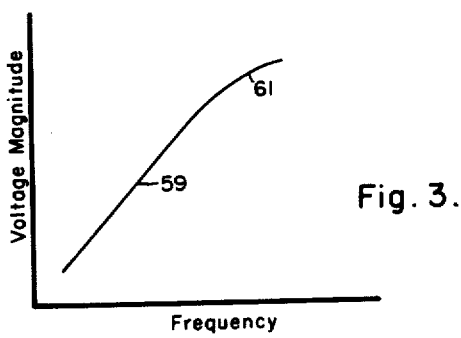
Fig. 3 is a graphical representation illustrating the relationship between certain quantities of the circuit of Fig. 1.

Referring to Fig. 3, there is illustrated a graphical representation showing the relationship between the magnitude of the voltage of the source 1 and the frequency of the alternating output voltage appearing across the output terminals 49 and 51 of the winding 47. With reference to Fig. 3, it is observed that the curve 59 is linear over a substantial range of voltage magnitudes except for a small portion 61 corresponding to relatively large magnitudes of voltage of the source 1. According to the present understanding of the invention, such deviation from the desired linearity for relatively large values of voltage of the source 1 is believed to be caused to a large extent by excessive loading of the transistors 3 and 5 effected by the induction of relatively large voltages in the windings 25 and 31 by current flowing from the source 1 through the windings 27 and 29.

Figure 4:
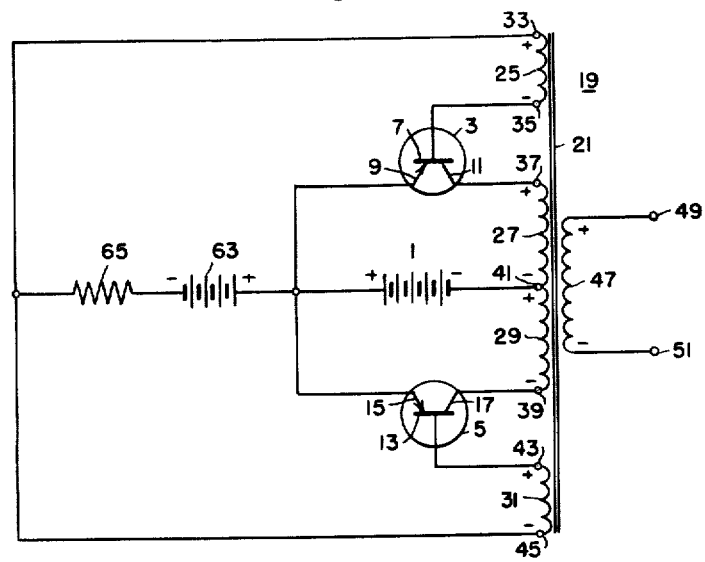
Figs. 4 and 5 are schematic representations of electrical circuits illustrating different embodiments of the invention of Fig. 1.

In accordance with the invention, means are provided for permitting a substantial reduction in the magnitudes of the base-emitter current of the transistors 3 and 5 for relatively large values of voltage of the source 1. Such means are also effective to cause conduction of one or the other of the transistors 3 and 5 to initiate operation of the inverter circuit. Referring now to Fig. 4, there is illustrated an inverter circuit which includes a number of components which are similar in construction and arrangement to certain components of Fig. 1. For this reason, similar components of Figs. 1 and 4 are represented by the same reference numerals.

As illustrated in Fig. 4, a source of biasing potential is provided which is represented by a conventional battery 63 having positive and negative terminals as indicated by the plus and minus signs associated with the battery. The positive terminal of the source 63 is connected to each of the emitters 9 and 15 of the transistors 3 and 5 whereas the negative terminal of the source 63 is connected through a series-resistor 65 and through each of the windings 25 and 31 to the base electrodes 7 and 13 of the transistors 3 and 5.

According to the present understanding of the invention, the source 63 constitutes a bias potential which is employed to supplement the biasing potentials supplied by the windings 25 and 31. For example, let it be assumed for purposes of illustration that the magnetic core 21 becomes saturated to thereby effect a reduction in the magnetic flux in the core 21, such as is indicated by the numeral 55 of Fig. 2, which causes a voltage to be induced in winding 31 for initiating conduction of transistor 5 as previously described. As transistor 5 starts to conduct, current from the source 63 will flow through the emitter 15 and the base 13 thereof to substantially increase conduction of transistor 5 to initiate the sequence of operations hereinbefore described.

In effect, the voltage induced in the winding 31 upon saturation of the core 21 operates merely to apply the source 63 to the transistor 5 which effects a major portion of the biasing function. The source 63 may be considered as constituting a constant current source which is applied between the base 13 and the emitter 15 of the transistor 5 to thereby prevent the flow of excessive current between the emitter 15 and the base 13 caused by relatively large voltages induced in the winding 31 by the source 1. Consequently, the number of turns of the winding 31 may be increased from the number required if the source 63 were omitted to thereby permit the use of lower values of voltage of the source 1 to initiate conduction of transistor 5 for applying the constant current source 63 to the transistor 5. It has been observed that with the arrangement just described the frequency of the alternating voltage appearing across the terminals 49 and 51 is substantially proportional to the magnitude of the voltage of the source 1 over a substantial range of voltages.

Figure 5:
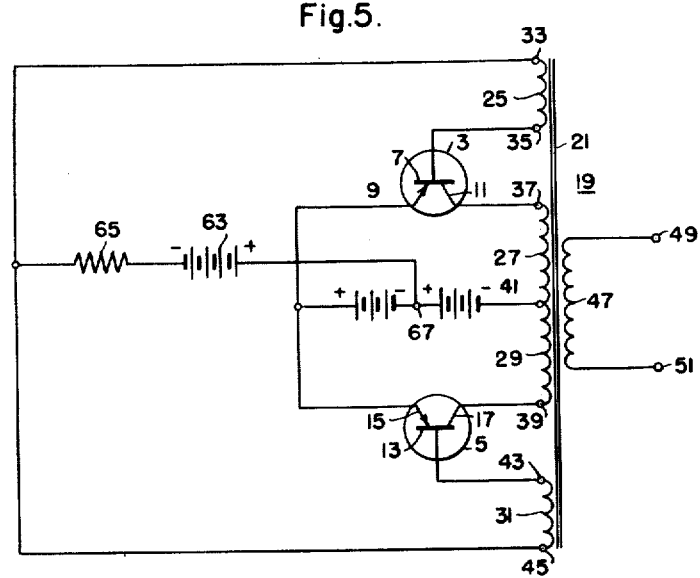

The linearity of the curve 59 may be further improved by means of the arrangement shown in Fig. 5. According to the embodiment of Fig. 5, a portion of the voltage source 1 is employed in conjunction with the source 63 as a biasing potential between the base and emitter electrodes of the transistors 3 and 5. To this end the positive terminal of the bias battery 63 is connected to a center tap connection 67 of the source 1 so that a portion of the source 1 is applied between the base and emitter electrodes of the transistors 3 and 5 cumulatively relative to the bias battery 63. With such an arrangement, it has been observed that the desired linear relationship between the frequency of the alternating output voltage and the magnitude of the voltage of the source 1 is substantially realized even for relatively large values of voltage of the source 1.

It is to be understood that the unidirectional voltage input to the inverter circuits as shown in Figs. 1, 4 and 5 may be replaced by the combination (not shown) of an alternating voltage input and a series or bridge connected rectifier element. With such an arrangement the conducting conditions of the transistors 3 and 5 will be reversed each time the time integral of the input voltage is sufficient to cause saturation of the core.

Figure 6:
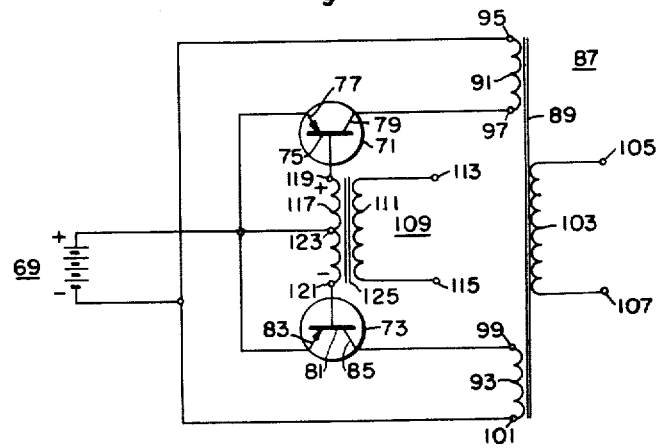
Figs. 6, 7 and 8 are schematic representations of electrical circuits illustrating further different embodiments of the invention of Fig. 1.

Referring now to Fig. 6, there is illustrated a further embodiment of the invention employing a different arrangement from the arrangements shown in Figs. 1, 4 and 5. As illustrated in Fig. 6, there is provided a source 69 of unidirectional voltage which is to be inverted to provide an alternating voltage having a frequency which is a function of the frequency of an alternating biasing voltage source which will be described hereinafter. A pair of switching transistors 71 and 73 of the P-N-P junction type are provided with the transistor 71 having a base electrode 75, an emitter electrode 77 and a collector electrode 79. In a similar manner the transistor 73 includes a base electrode 81, an emitter electrode 83 and a collector electrode 85. The transistors 71 and 73 are associated with suitable electromagnetic means 87 which includes a magnetic core 89 and a pair of windings 91 and 93 linking the magnetic core 89. If desired, the core 89 may be of the type having rectangular hysteresis loop characteristics. Preferably, however, the core 89 is of conventional construction exhibiting conventional hysteresis loop characteristics. The winding 91 is provided with terminals 95 and 97, whereas the winding 93 is provided with terminals 99 and 101. An additional winding 103 links the magnetic core 89 in inductive relation with the windings 91 and 93 and is provided with output terminals 105 and 107. As shown in Fig. 6, the terminals 95 and 101 of the windings 91 and 93 respectively are connected to the negative terminal of the source 69. The positive terminal of the source 69 is connected to the emitters 77 and 83 of the transistors 71 and 73. The collector electrodes 79 and 75 of the transistors 71 and 73 are connected respectively to the terminals 97 and 99 of the windings 91 and 93.

In order to control the operating conditions of the switching transistors 71 and 73, there is provided a source of alternating voltage which is represented by a transformer 109 including a primary winding 111 having input terminals 113 and 115 and a secondary winding 117 having output terminals 119 and 121. The windings 111 and 117 link a magnetic core 125. In order to provide a reversible polarity biasing potential for the transistors 71 and 73, the output terminals 119 and 121 of the winding 117 are connected respectively to the base electrodes 75 and 81 of the transistors 71 and 73. The winding 117 is provided with a center tap connection 123 which is connected to the emitter electrodes 77 and 83 of the transistors 71 and 73. The voltage supplied by the transformer 109 preferably follows a rectangular wave pattern and is of sufficient magnitude to alternately drive the transistors 3 and 5 to saturation and cut-off.

The control voltage supplied by the transformer 109 may be derived from any suitable external source or it may be obtained by applying a portion of the alternating output quantity appearing across the secondary winding 103 to the input terminals 113 and 115 of the transformer 109. By providing a control voltage effective to operate the transistors 71 and 73 in either a saturated or cut-off condition, the power-loss in the transistors will be relatively small, and therefore, the efficiency of the inverted circuit of Fig. 6 can be expected to be quite good.

The operation of the circuit of Fig. 6 may now be described. Let it be assumed that the alternating control voltage supplied by the transformer 109 drives the terminal 119 of the winding 117 positive relative to the terminal 121 of the winding 117 as illustrated by the positive and negative signs associated with the winding 117. With such conditions, the base 75 of the transistor 71 is at a positive potential relative to the emitter 77 of the transistor 71 with the result that the transistor 71 is substantially in a cut-off condition. However, the base 81 of the transistor 73 is simultaneously driven negative relative to the emitter 83 of the transistor 73 with the result that the transistor 73 approaches a saturated condition. This causes the voltage source 69 to be applied across the terminals 99 and 101 of the winding 93 with the result that a current flows through the winding 93 to produce a first voltage pulse across the output terminals 105 and 107.

For the succeeding half-cycle of control voltage, the polarities of the terminals 119 and 121 of the winding 117 are reversed with the result that the transistor 71 approaches a saturated condition and the transistor 73 is cut-off. The voltage source 69 is now applied directly across the winding 91 to cause current flow through the winding 91 which is effective to produce a second voltage pulse across the output terminals 105 and 107. Polarities of the connections of the windings 91, 93, and 103 are such that the second voltage induced in the secondary winding 103 is of opposite polarity from the first voltage induced in the winding 103 by reason of current flowing through the winding 93 from the source 69. Consequently, for each complete cycle of control voltage from the transformer 109 a complete cycle of voltage will appear across the output terminals 105 and 107 having substantially a rectangular wave pattern. Such a pattern is produced by reason of the rectangular wave pattern of the voltage of the source 109 which effects successive reversals of the conducting conditions of the transistors 71 and 73. The frequency of the voltage appearing across the output terminals 105 and 107 will be proportional to the frequency of the voltage of the source 109 since the frequency of the voltage of the source 109 determines the frequency of reversals of the conducting conditions of the transistors 71 and 73, which, in turn, determines the frequency of the output voltage.

It will be observed that the transformer 87 includes a pair of primary windings 91 and 93 associated with the transistors 71 and 73, respectively, to thereby provide a total of four input terminals. In practice, the utilization means may comprise any suitable load device, such as a device having only two input terminals.

Figure 7:
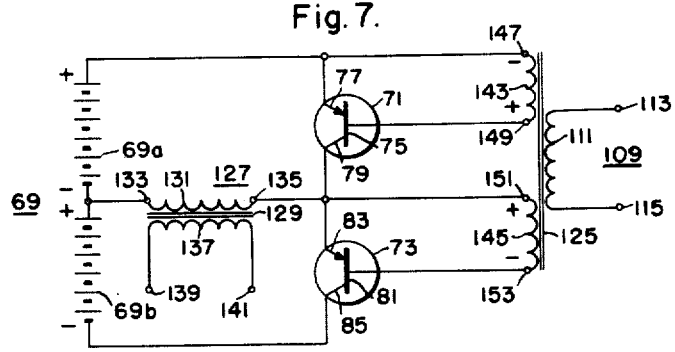

In the specific embodiment of Fig. 7, there is provided an inversion circuit which includes a load device having but two input terminals. A suitable transformer is shown for purposes of illustration. Certain components of the circuit of Fig. 7 are similar to components of the device of Fig. 6. For this reason similar components of Figs. 6 and 7 are represented by the same reference numerals.

As illustrated in Fig. 7, there is provided a direct current source 69 which is similar to the source 69 of Fig. 6; however, the source 69 of Fig. 7 is represented by a pair of batteries 69A and 69B having polarities as indicated by the plus and minus signs associated with the batteries 69A and 69B. In accordance with the invention, an output transformer 127 is provided which includes a magnetic core 129 with primary and secondary windings 131 and 137 linking the magnetic core 129. The primary winding 131 includes terminals 133 and 135, and the secondary winding 137 is provided with terminals 139 and 141. As illustrated in Fig. 7, the winding 131 is connected for energization from the source 69 under control of the switching transistors 71 and 73 in such a manner that a tapped connection of the winding 131 is not required. To this end, the terminal 133 of the winding 131 is connected to the source 69 so that one-half of the source 69 is applied across the winding 131 during each half cycle of the alternating control voltage. The terminal 135 of the winding 131 is connected to the collector electrode 79 of the transistor 71 and to the emitter electrode 83 of the transistor 73. The alternating control voltage is applied to the input terminals 113 and 115 of the primary winding 111 of a transformer 109 to induce voltages in a pair of secondary windings 143 and 145 having, respectively, terminals 147 and 149 and terminals 151 and 153. As shown, the terminals 147 and 149 of the winding 143 are connected, respectively, to the emitter 77 and the base 75 of the transistor 71. The terminals 151 and 153 of the winding 145 are connected, respectively, to the emitter 83 and the base 81 of the transistor 73. The polarities of the connections of the windings 143 and 145 are such that voltages induced in the windings 143 and 145 are effective to reverse the conducting conditions of the transistors 71 and 73 in phase opposition relative to each other.

The operation of the device of Fig. 7 is similar to that of the device of Fig. 6. It will be assumed that for one-half cycle of control voltage from the source 109, the polarities of the windings 143 and 145 are as shown in Fig. 7, whereby the transistor 71 is rendered non-conducting and the transistor 73 is rendered conducting so that the portion of the input 69, represented by the battery 69B, is applied across the primary winding 131 to produce a first voltage pulse which appears across the output terminals 139 and 141 of the winding 137. For the succeeding cycle of control voltage, the situation is reversed with the transistor 71 being in a conducting state and the transistor 73 being cut-off with the result that the portion of the input 69, represented by the battery 69A, is applied across the winding 131 to produce a second voltage pulse which appears across the output terminals 139 and 141. Polarities of the connections of the terminals 133 and 135 relative to the parts 69a and 69b are such that for each complete cycle of control voltage produced by the transformer 109 there is produced one complete cycle of output voltage by the output transformer 127.

Figure 8:
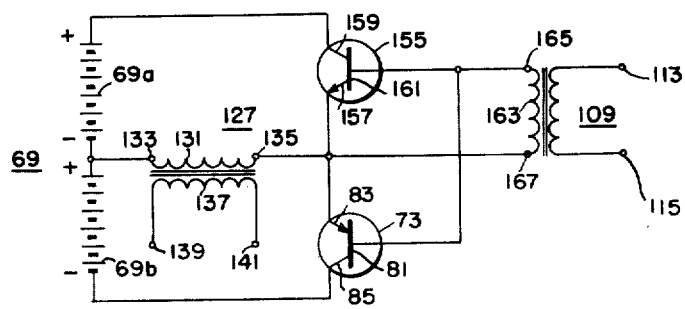

As stated previously, transistors may be employed which are either of the p–n–p type or n–p–n type. In the embodiments of Figs. 1, 4, 5, 6, and 7, transistors of the p–n–p type are utilized. With reference to Fig. 8, there is illustrated an inverter circuit which is similar in construction and operation to the circuit of Figs. 6 and 7 with the exception that one of the switching transistors is of the p–n–p type and the other of the switching transistors of the n–p–n type. For example, there is provided a transistor 155 which is of the n–p–n type and which includes an emitter electrode 157, a collector electrode 159, and a base electrode 161. An additional transistor 73 is provided which is similar to the transistor 73 of Figs. 6 and 7. In order to effect periodic alternation of the conducting conditions of the transistors 73 and 155 in phase opposition relative to each other, it is necessary that the alternating control voltage supplied by the transformer 109 is of such polarity that the base electrodes 161 and 81 of the transistors 155 and 73 are of the same polarity relative to each other when the associated emitter electrodes are of the same polarity relative to each other. In order to provide such an arrangement, a secondary winding 163 is provided having a terminal 165 which is connected to the base electrodes 161 and 81 of the transistors 155 and 73, and having a terminal 167 which is connected to the emitter electrodes 157 and 83 of the transistors 155 and 73. The operation of the device of Fig. 8 is exactly the same as the devices of Figs. 6 and 7 and need not be described.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In an electrical system, unidirectional voltage producing means, a first semi-conductor device of the P–N–P type, a second semi-conductor device of the N–P–N type, each of said first and second devices including a base electrode, an emitter electrode and a collector electrode, translating means including first and second input terminals, and control means for producing biasing potentials of periodically reversible polarity for biasing said first and second devices, said control means having first and second output terminals, being connected to one pair of corresponding electrodes of the emitter and collector electrodes of said first and second devices, said second output terminal being connected to the base electrode of each of said first and second devices, said first input terminal being connected to said one pair of corresponding electrodes of said first and second devices, a separate portion of the unidirectional voltage producing means being connected between said second input terminal and each electrode of the remaining pair of corresponding electrodes of the emitter and collector electrodes of said first and second devices, each of said devices having a cutoff current conducting condition between the emitter and collector electrodes for one polarity of biasing potential and a saturated current conducting condition between the emitter and collector electrodes for the opposite polarity of biasing potential.

2. In an electrical system, a source of unidirectional voltage, a magnetic core, first, second and third winding means linking the core in inductive relation relative to one another, a pair of semi-conductor devices each including a base electrode, an emitter electrode and a collector electrode, said first winding means being connected for energization from said source through separate paths effecting opposing directions of magnetization of said core, and a pair of output terminals energizable from said second winding means, each of said paths including the emitter and collector electrodes of a separate one of said devices, said core being proportioned for saturation within the range of energization of said first winding means, said third winding means being connected to apply voltages induced therein between the base electrode and one of the emitter and collector electrodes of each of said devices, each of said devices having a cutoff current conducting condition between the emitter and collector electrodes for one polarity of said induced voltages, and a saturated current conducting condition between the emitter and collector electrodes for the opposite polarity of said induced voltages, said third winding means being connected to apply said induced voltages with polarities effective to establish opposing current conducting conditions of said devices, each of said devices being biased so as to transfer from one to the other of said current conducting conditions in response to voltages induced in said third winding means upon each occurrence of saturation of said core, said second winding means delivering to said output terminals alternating voltage induced therein in response to energization of said first winding means having a frequency dependent upon the frequency of saturation of said core.

3. In an electrical system, a source of unidirectional voltage, a magnetic core, first and second winding means linking the core in inductive relation relative to each other, a pair of switch means each having an effective open and closed operating condition, said first winding means being connected for energization from said source through separate paths effecting opposing directions of magnetization of said core, a pair of output terminals energizable from said second winding means, each of said paths including a separate one of said switch means, said core being proportioned for saturation within the range of energization of said first winding means, and control means for controlling operation of said switch means to establish opposing operating conditions thereof, said control means being effective in response to saturation of said core to reverse the operating conditions of said switch means, each of said switch means being arranged so as to transfer from one to the other of said operating conditions upon each occurrence of saturation of said core, said second winding means delivering to said output terminals alternating voltage induced therein in response to energization of said first winding means having a frequency dependent upon the frequency of saturation of said core.

4. In an electrical system, a source of unidirectional voltage having a pair of first terminals, a magnetic core, first, second and third winding means linking the core in inductive relation relative to one another, a pair of semi-conductor devices each having a base electrode, an emitter electrode and a collector electrode, the emitter electrode of each of said devices being connected to one of said first terminals, the collector electrode of each of said devices being connected to the other of said first terminals through a separate portion of said first winding means, a source of bias voltage common to each of said devices, impedance means connected in series with said source of bias voltage, said source of bias voltage and said impedance means being connected between the base electrode and the emitter electrode of each of said devices, said core being proportioned for saturation within the range of energization of said first winding means, said second winding means being connected to apply voltages induced therein between the base electrode and the emitter electrode of each of said devices, each of said devices having a cutoff current conducting condition between the emitter and collector electrodes for one polarity of said induced voltages, and a saturated current conducting condition between the emitter and collector electrodes for the opposite polarity of said induced voltages, and a pair of output terminals energizable from said third winding means, said second winding means being connected to apply said induced voltages with polarities effective to establish opposing current conducting conditions of said devices, said source of bias voltage being connected to permit the transfer of each of said devices from one to the other of said current conducting conditions in response to voltages induced in said second winding means upon each occurrence of saturation of said core, said third winding means delivering to said output terminals alternating voltage induced therein in response to energization of said first winding means having a frequency dependent upon the frequency of saturation of said core.

5. In an electrical system, a source of unidirectional voltage, a magnetic core, first, second and third winding means linking the core in inductive relation relative to one another, a pair of electro-responsive devices each having at least three electrodes, said first winding means being connected for energization from said source through separate paths effecting opposing directions of magnetization of said core, and a pair of output terminals energizable from said second winding means, each of said paths including a pair of electrodes of each of said devices, said core being proportioned for saturation within the range of energization of said first winding means, said third winding means being connected to apply voltages induced therein between one electrode of each pair of electrodes and a third electrode of each device, each of said devices having a substantially non-conducting condition between said pair of electrodes for one polarity of said induced voltages, and a conducting condition between said pair of electrodes for the opposite polarity of said induced voltages, said third winding means being connected to apply said induced voltages with polarities effective to establish opposing conducting conditions of said devices, each of said devices being biased so as to transfer from one to the other of said conducting conditions in response to voltages induced in said third winding means upon each occurrence of saturation of said core, said second winding means delivering to said output terminals, alternating voltage induced therein in response to energization of said first winding means having a frequency dependent upon the frequency of saturation of said core.

6. In an electrical system, a source of unidirectional input voltage, translating means, a pair of output terminals energizable from said translating means, a pair of electrical paths connecting the translating means for energization from said source to provide opposing directions of energization of said translating means, a pair of semi-conductor devices each including a base electrode, an emitter electrode and a collector electrode, the emitter and collector electrodes of each of said devices being included in a separate one of said paths, and control means for producing biasing potentials of reversing polarity for biasing said devices, said control means being connected to apply a separate biasing potential between the base electrode and one of the emitter and collector electrodes of each of said devices, each of said devices having a substantially non-conducting condition between the emitter and collector electrodes for one polarity of biasing potential, and a conducting condition between the emitter and collector electrodes for the opposite polarity of biasing potential, said control means being connected to apply the biasing potentials with polarities effective to establish opposing conducting conditions of said devices, each of said devices being biased so as to transfer from one to the other of said conducting conditions in response to each reversal of polarity of the applied biasing potential, said translating means delivering to said output terminal an alternating quantity having a frequency dependent upon the frequency of reversal of polarity of said biasing potentials.

7. In an electrical system, a source of unidirectional input voltage, a pair of semiconductor devices each having a base electrode, an emitter electrode and a collector electrode, magnetic core means, first and second winding means linking the core means in inductive relation relative to each other, said first winding means being connected for energization from said source through separate paths effecting opposing directions of magnetization of said core means, a pair of output terminals energizable from said second winding means, each of said paths including the emitter and collector electrodes of a separate one of said devices, and control means for producing biasing potentials of reversing polarity for biasing said devices, said control means being connected to apply a separate biasing potential between the base electrode and one of the emitter and collector electrodes of each of said devices, each of said devices having a substantially non-conducting condition between the emitter and collector electrodes for one polarity of biasing potential, and a conducting condition between the emitter and collector electrodes for the opposite polarity of biasing potential, said control means being connected to apply the biasing potentials with polarities effective to establish opposing conducting conditions of said devices, each of said devices being biased so as to transfer from one to the other of said conducting conditions in response to each reversal of polarity of the applied biasing potential, said second winding means delivering to said output terminals alternating voltage induced therein in response to energization of said first winding means having a frequency dependent upon the frequency of reversal of polarity of said biasing potentials.

8. In an electrical system, a source of unidirectional voltage, electromagnetic means including magnetic core means proportioned for saturation within the range of energization of said electromagnetic means, first winding means linking the core means, and second winding means linking the core means in inductive relation to said first winding means; first and second switch means each having an opened and closed operating condition, said first winding means being connected for energization from said source through separate paths effecting opposing directions of magnetization of said core means, a pair of output terminals energizable from said second winding means, each of said paths including a separate one of said first and second switch means, and control means for controlling operation of said switch means, said control means comprising third winding means linking said core means in inductive relation to said first winding means, said third winding means being connected to apply voltages induced therein to each of said switch means with polarities effective to establish opposing operating conditions of said switch means, each of said switch means being arranged so as to transfer from one to the other of said operating conditions in response to voltages induced in said third winding means upon each occurrence of saturation of said core means, said second winding means delivering to said output terminals alternating voltage induced therein in response to energization of said first winding means having a frequency dependent upon the frequency of saturation of said core means.

9. In an electrical system, unidirectional voltage producing means, first and second semiconductor devices each including a base electrode, an emitter electrode and a collector electrode, magnetic core means, first winding means linking the core means connected for energization from said voltage producing means through separate paths effecting opposing directions of magnetization of said core means, said core means being proportioned for saturation within the range of energization of said first winding means, each of said paths including the emitter and collector electrodes of a separate one of said first and second semiconductor devices, second winding means linking the core means in inductive relation with said first winding means, a common source of bias voltage connected between the base electrode and one of the emitter and collector electrodes of each of said devices, said second winding means being connected to apply voltages induced therein between the base electrode and one of the emitter and collector electrodes of each of said devices, output winding means linking said core means in inductive relation with said first winding means, and a pair of output terminals energizable from said output winding means, each of said devices having a substantially non-conducting condition between the emitter and collector electrodes for one polarity of said induced voltages, and a conducting condition between the emitter and collector electrodes for the opposite polarity of said induced voltages, said second winding means being connected to apply said induced voltages with polarities effective to establish opposing conducting conditions of said devices, said source of bias voltage being connected to permit the transfer of each of said devices from one to the other of said conducting conditions in response to voltages induced in said second winding means upon each occurrence of saturation of said core means, said output winding means delivering to said output terminals alternating voltage induced therein having a frequency dependent upon the frequency of saturation of said core means.

10. In an electrical system, unidirectional voltage producing means, first and second semiconductor devices each including a base electrode, an emitter electrode and a collector electrode, magnetic core means, first winding means linking the core means connected for energization from said voltage producing means through separate paths effecting opposing directions of magnetization of said core means, said core means being proportioned for saturation within the range of energization of said first winding means, each of said paths including the emitter and collector electrodes of a separate one of said first and second semiconductor devices, second winding means linking the core means in inductive relation with said first winding means, a common source of bias voltage connected between the base electrode and one of the emitter and collector electrodes of each of said devices, said source of bias voltage including a portion of said unidirectional voltage producing means, said second winding means being connected to apply voltages induced therein between the base electrode and one of the emitter and collector electrodes of each of said devices, output winding means linking said core means in inductive relation with said first winding means, and a pair of output terminals energizable from said output winding means, each of said devices having a substantially non-conducting condition between the emitter and collector electrodes for one polarity of said induced voltages, and a conducting condition between the emitter and collector electrodes for the opposite polarity of said induced voltages, said second winding means being connected to apply said induced voltages with polarities effective to establish opposing conducting conditions of said devices, said source of bias voltage being connected to permit the transfer of each of said devices from one to the other of said conducting conditions in response to voltages induced in said second winding means upon each occurrence of saturation of said core means, said output winding means delivering to said output terminals alternating voltage induced therein having a frequency dependent upon the frequency of saturation of said core means.

11. In an electrical system, unidirectional voltage producing means having a pair of spaced first terminals, translating means including two pairs of input terminals, first and second electroresponsive devices each including at least three electrodes, one electrode of a pair of electrodes of each of said electroresponsive devices being connected to one of said first terminals through a separate pair of said pairs of input terminals, the remaining electrode of said pair of electrodes of each of said electroresponsive devices being connected to the other of said first terminals, and an impedance element having a pair of spaced second terminals with a third terminal intermediate with second terminals, a separate one of said second terminals being connected to a third electrode of each of said electroresponsive devices, said third terminal being connected to one electrode of said pair of electrodes of each of said electroresponsive devices, said impedance element being energizable to produce a separate potential of reversing polarity between said third terminal and each of said second terminals, each of said electroresponsive devices having a substantially non-conducting condition between said pair of electrodes for one polarity of the associated potential, and a conducting condition between said pair of electrodes for the opposite polarity of the associated potential.

12. In an electrical system, unidirectional voltage producing means having a pair of spaced first terminals with a second terminal intermediate said second terminals, a translating device having a pair of input terminals, first and second electroresponsive devices each having at least three electrodes, one electrode of a pair of electrodes of each of said electroresponsive devices being connected to a separate one of said first terminals, the remaining electrode of said pair of electrodes of each of said electroresponsive devices being connected to one of said input terminals, the other of said input terminals being connected to said second terminal, and control means for producing biasing potentials of reversing polarity for biasing said electroresponsive devices, said control means being connected to apply a separate biasing potential between a third electrode and one electrode of said pair of electrodes of each of said electroresponsive devices, each of said electroresponsive devices having a substantially non-conducting condition between said pair of electrodes for one polarity of biasing potential, and a conducting condition between said pair of electrodes for the opposite polarity of biasing potential.

13. In an electrical inverter system, a pair of output terminals, a source of unidirectional input voltage, and inverter means for delivering to the output terminals an alternating output voltage having a frequency dependent upon the magnitude of said source, said inverter means including saturable magnetic core means, a pair of electrical paths connected for energization from said source for supplying to said core means magnetomotive forces acting in opposing directions, a separate electrical switch device included in each of said paths, each of said switch devices being operable to transfer the associated path between a conductive condition and a substantially non-conductive condition, switch operating means effective in response to saturation of said core means produced by a conductive condition of one of said paths while the other of said paths is in a substantially non-conductive condition to operate said switch devices for reversing the conductive conditions of said paths, said switch operating means being additionally effective in response to saturation of said core means produced by a conductive condition of said other of said paths while said one of said paths is in a substantially non-conductive condition to operate said switch devices for reversing the conductive conditions of said paths, and output winding means linking said core means to deliver to said output terminals alternating voltage induced therein having a frequency dependent upon the frequency of saturation of said core means.

14. In an electrical system, a source of unidirectional voltage, electromagnetic means including magnetic core means proportioned for saturation within the range of energization of said electromagnetic means, said core means being constructed of material exhibiting substantially rectangular hysteresis loop characteristics, first winding means linking the core means, and second winding means linking the core means in inductive relation to said first winding means; first and second switch means each having an opened and closed operating condition, said first winding means being connected for energization from said source through separate paths effecting opposing directions of magnetization of said core means, a pair of output terminals energizable from said second winding means, each of said paths including a separate one of said first and second switch means, and control means for controlling operation of said switch means, said control means comprising third winding means linking said core means in inductive relation to said first winding means, said third winding means being connected to apply voltages induced therein to each of said switch means with polarities effective to establish opposing operating conditions of said switch means, each of said switch means being arranged so as to transfer from one to the other of said operating conditions in response to voltages induced in said third winding means upon each occurrence of saturation of said core means, said second winding means delivering to said output terminals alternating voltage induced therein in response to energization of said first winding means having a frequency dependent upon the frequency of saturation of said core means.

15. In an electrical inverter system, a pair of output terminals, a source of unidirectional voltage, and inverter means for delivering to the output terminals an alternating output voltage having a frequency dependent upon the magnitude of said source, said inverter means including saturable magnetic core means, a pair of electrical paths connected for energization from said source for supplying to said core means magnetomotive forces acting in opposing directions, a pair of semi-conductor devices each having a base electrode, an emitter electrode and a collector electrode, the emitter and collector electrodes of each of said devices being included in a separate one of said paths, each of said devices being operable to transfer the associated path between a conductive condition and a substantially non-conductive condition, control means effective in response to saturation of said core means produced by a conductive condition of one of said paths while the other of said paths is in a substantially non-conductive condition to apply biasing potentials between the base electrode and one of the emitter and collector electrodes of each of said devices to operate said devices for reversing the conductive conditions of said paths, said control means being additionally effective in response to saturation of said core means produced by a conductive condition of said other of said paths while said one of said paths is in a substantially non-conductive condition to apply biasing potentials between the base electrode and one of the emitter and collector electrodes of each of said devices to operate said devices for reversing the conductive conditions of said paths, and output winding means linking said core means to deliver to said output terminals alternating voltage induced therein having a frequency dependent upon the frequency of saturation of said core means.

16. In an electrical system, a source of unidirectional input voltage, translating means, a pair of output terminals energizable from said translating means, a pair of electrical paths connecting the translating means for energization from said source to provide opposing directions of energization of said translating means, a pair of electroresponsive devices each having at least three electrodes, a pair of electrodes of each of said devices being included in a separate one of said paths, and control means for producing biasing potentials of reversing polarity having substantially rectangular wave patterns for biasing said devices, said control means being connected to apply a separate biasing potential between one electrode of each pair of electrodes and a third electrode of each device, each of said devices having a substantially non-conducting condition between said pair of electrodes for one polarity of biasing potential, and a conducting condition between said pair of electrodes for the opposite polarity of biasing potential, said control means being connected to apply said biasing potentials with polarities effective to establish opposing conducting conditions of said devices, each of said devices being biased so as to transfer from one to the other of said conducting conditions in response to each reversal of polarity of the applied biasing potential, said translating means delivering to said output terminals an alternating quantity having a frequency dependent upon the frequency of reversal of polarity of said biasing potentials.

17. In an electrical system, a source of unidirectional input voltage, a pair of semiconductor devices each having a base electrode, an emitter electrode, and a collector electrode, magnetic core means, first and second winding means linking the core means in inductive relation relative to each other, said first winding means being connected for energization from said source through separate paths effecting opposing directions of magnetization of said core means, a pair of output terminals energizable from said second winding means, each of said paths including the emitter and collector electrodes of a separate one of said devices, and control means for producing biasing potentials of reversing polarity having substantially rectangular wave patterns for biasing said devices, said control means being connected to apply a separate biasing potential between the base electrode and one of the emitter and collector electrodes of each of said devices, each of said devices having a substantially non-conducting condition between the emitter and collector electrodes for one polarity of biasing potential, and a conducting condition between the emitter and collector electrodes for the opposite polarity of biasing potential, said control means being connected to apply the biasing potentials with polarities effective to establish opposing conducting conditions of said devices, each of said devices being biased so as to transfer from one to the other of said conducting conditions in response to each reversal of polarity of the applied biasing potential, said second winding means delivering to said output terminals alternating voltage induced therein in response to energization of said first winding means having a frequency dependent upon the frequency of reversal of polarity of said biasing potentials.

18. In an electrical system, a source of unidirectional voltage, magnetic core means, first, second and third winding means linking the core means in inductive relation relative to one another, a pair of semiconductor devices each including a base electrode, an emitter electrode and a collector electrode, said first winding means being connected for energization from said source through separate paths effecting opposing directions of magnetization of said core means, and a pair of output terminals energizable from said second winding means, each of said paths including the emitter and collector electrodes of a separate one of said devices, said core means being proportioned for saturation within the range of energization of said first winding means, said core means being constructed of material exhibiting substantially rectangular hysteresis loop characteristics, said third winding means being connected to apply voltages induced therein between the base electrode and one of the emitter and collector electrodes of each of said devices, each of said devices having a cutoff current conducting condition between the emitter and collector electrodes for one polarity of said induced voltages, and a saturated current conducting condition between the emitter and collector electrodes for the opposite polarity of said induced voltages, said third winding means being connected to apply said induced voltages with polarities effective to establish opposing current conducting conditions of said devices, each of said devices being biased so as to transfer from one to the other of said current conducting conditions in response to voltages induced in said third winding means upon each occurrence of saturation of said core means, said second winding means delivering to said output terminals alternating voltage induced therein in response to energization of said first winding means having a frequency dependent upon the frequency of saturation of said core means.

19. In an electrical system, a source of unidirectional input voltage, translating means, a pair of output terminals energizable from said translating means, a pair of electrical paths connecting the translating means for energization from said source to provide opposing directions of energization of said translating means, a pair of semiconductor devices each including a base electrode, an emitter electrode and a collector electrode, the emitter and collector electrodes of each of said devices being included in a separate one of said paths, and control means for producing biasing potentials of reversing polarity having substantially rectangular wave patterns for biasing said devices, said control means being connected to apply a separate biasing potential between the base electrode and one of the emitter and collector electrodes of each of said devices, each of said devices having a substantially non-conducting condition between the emitter and collector electrode for one polarity of biasing potential, and a conducting condition between the emitter and collector electrodes for the opposite polarity of biasing potential, said control means being connected to apply the biasing potentials with polarities effective to establish opposing conducting conditions of said devices, each of said devices being biased so as to transfer from one to the other of said conducting conditions in response to each reversal of polarity of the applied biasing potential, said translating means delivering to said output terminals an alternating quantity having a frequency dependent upon the frequency of reversal of polarity of said biasing potentials.

References Cited in the file of this patent
UNITED STATES PATENTS 2,680,160    Yaeger _____ June 1, 1954

OTHER REFERENCES

"Transistor Power Supply for Geiger Counters," Pearlman, Electrons, vol. 27, No. 8, pp. 144–145, August 1954.

Disclaimer 2,783,384.—*Richard L. Bright*, Adamsburg, and *George H. Royer*, Pittsburgh, Pa. ELECTRICAL INVERTER CIRCUITS. Patent dated Feb. 26, 1957. Disclaimer filed Nov. 10, 1971, by the assignee, *Westinghouse Electric Corporation*.

Hereby enters this disclaimer to claims 2, 3, 5, 6, 7, 8, 11, 12, 13, 15, 16, 17 and 19 of said patent.

[*Official Gazette December 26, 1972.*]